(12) United States Patent
Scheie et al.

(10) Patent No.: US 7,767,767 B2
(45) Date of Patent: Aug. 3, 2010

(54) MODIFICATION OF POLYETHYLENE WITH OZONE

(75) Inventors: Andrew J. Scheie, Cincinnati, OH (US); Richard T. E. Sylvester, Liberty Township, OH (US)

(73) Assignee: Equistar Chemicals, LP, Houston, TX (US)

( * ) Notice: Subject to any disclaimer, the term of this patent is extended or adjusted under 35 U.S.C. 154(b) by 137 days.

(21) Appl. No.: 11/906,306

(22) Filed: Oct. 1, 2007

(65) Prior Publication Data

US 2009/0088534 A1 Apr. 2, 2009

(51) Int. Cl.
*C08F 8/06* (2006.01)

(52) U.S. Cl. ............. 525/333.8; 252/186.1; 525/333.7; 525/383; 525/388

(58) Field of Classification Search ............. 525/333.8, 525/388
See application file for complete search history.

(56) References Cited

U.S. PATENT DOCUMENTS

| 3,234,197 | A | | 2/1966 | Baum |
| 3,692,877 | A | | 9/1972 | Shibahara et al. |
| 4,889,897 | A | * | 12/1989 | Schuster et al. ............. 525/388 |
| 5,064,908 | A | | 11/1991 | Schuster et al. |
| 5,534,472 | A | | 7/1996 | Winslow et al. |
| 6,964,937 | B2 | * | 11/2005 | Mink et al. .................. 502/113 |

FOREIGN PATENT DOCUMENTS

| GB | 951308 | * | 3/1964 |
| GB | 997135 | | 7/1965 |
| GB | 1087914 | | 10/1967 |

OTHER PUBLICATIONS

Chtourou et al., Synthetic Pulp Fiber Ozonation: An ESCA and FTIR Study., Journal of Applied Polymer Science, vol. 49, 361-373 (1993).*

R. Shroff et al., "New measures of polydispersity from rheological data on polymer melts", in *J. Applied Polymer Science* (1995) pp. 1605-1626, vol. 57.

* cited by examiner

*Primary Examiner*—Vasu Jagannathan
*Assistant Examiner*—Robert C Boyle
(74) *Attorney, Agent, or Firm*—Shao-Hua Guo

(57) ABSTRACT

A method of modifying polyethylene is disclosed. The method comprises contacting the polyethylene powder with ozone. The modified polyethylene exhibits an increase in melt elasticity and the complex viscosity at low shear rates. The rheological benefits are achieved without a significant reduction in the weight average molecular weight of the polyethylene. The modified polyethylene can be used in applications that require higher melt strength such as film or blow molding.

11 Claims, No Drawings

MODIFICATION OF POLYETHYLENE WITH OZONE

FIELD OF INVENTION

The present invention relates to a method of modifying polyethylene with ozone. More particularly, the invention relates to modifying polyethylene at a low temperature to provide the polyethylene with increased melt elasticity but minimum reduction in molecular weight.

BACKGROUND OF THE INVENTION

Ozone gas is an oxidizing agent that is used to treat polyethylene resins. The free radicals generated by the ozone can abstract hydrogen from the polyethylene backbone. Depending on the reaction conditions, e.g. temperature, the removal of hydrogen can result in chain scission, chain extension, crosslinking or the addition of functional groups to the polyethylene resin.

One approach of modifying polyethylene is to oxidize the polyethylene resin at a temperature above its melting point ($T_m$). Oxidizing the polyethylene resin can result in significant reductions in molecular weight and increases in melt indices (MI). It can also cause crosslinking and increasing in viscosity. The increase in viscosity can prevent the rapid diffusion of ozone through the molten polyethylene. Moreover, the reduction in molecular weight can limit the applications that the polyethylene resin is used for, see GB Pat. No. 1,087,914.

Solid-state oxidation of the polyethylene resin is another approach. GB Pat. No. 997,135 discloses oxidizing a polyethylene resin at a temperature ranging from 90° C. to 5° C. below the melt temperature ($T_m$) for a period of time ranging from 12 hours to 36 hours. An oxygen containing gas is used and optionally a promoter, e.g. ozone, in an amount ranging from about 0.05 wt. % to about 5 wt. %, see also GB Pat. No. 951,308. This approach also causes significant reduction in molecular weight.

There exists a need for new methods of modifying polyethylene resins that would enhance the properties of the polyethylene without the drawbacks, e.g. significant reductions in molecular weight.

SUMMARY OF THE INVENTION

The present invention is directed to a method of modifying polyethylene resins by contacting the resin powder with ozone at a temperature within a range of about 20° C. to about 80° C. for a period of time preferably within the range of about 30 minutes to about 8 hours. The amount of ozone is within the range of about 0.01 wt % to about 200 wt % of the polyethylene resin. Surprisingly, the method of the invention produces modified-polyethylene resins that exhibit significantly increased melt elasticity (ER) and relatively minor reductions in weight average molecular weight. The modified polyethylene resins are especially useful for applications that require increased melt strength such as film and extrusion processes.

DETAILED DESCRIPTION OF THE INVENTION

The method of the invention comprises contacting a polyethylene powder with ozone at a relatively low temperature and relatively high ozone concentration. The method surprisingly provides the modified polyethylene with increased melt elasticity with minimum effect on its molecular weight.

The modification is carried out at a temperature within the range of about 20° C. to about 80° C., more preferably about 25° C. to about 55° C., and most preferably about 25° C. to about 35° C. One advantage of the invention is to modify the polyethylene with ozone at a relatively low temperature so that the modified polyethylene has an increased melt properties but with limited reduction in its molecular weight.

The modification is carried out at a relatively high concentration of ozone. Preferably the concentration of ozone is within the range of about 0.01 wt % to about 200 wt %, more preferably from about 0.1 wt % to about 100 wt %, and most preferably from about 6 wt % to about 100 wt % of the polyethylene.

The contacting time of polyethylene with ozone varies depending on the modification temperature and the ozone concentration. Preferably the contacting time is within the range from about 30 minutes to about 8 hours, more preferably from about 1 hour to about 6 hours, and most preferably from about 2 hours to about 5 hours.

Suitable polyethylene for the use in the invention includes high density polyethylene (HDPE), medium density polyethylene (MDPE), low density polyethylene (LDPE), linear low-density polyethylene (LLDPE), the like, and mixtures thereof. HDPE has a density of about 0.941 g/cm$^3$ or greater; MDPE has a density within the range of about 0.926 g/cm$^3$ to about 0.940 g/cm$^3$; and LDPE and LLDPE have a density that lower than or equal to 0.925 g/cm$^3$. See ASTM D4976-98: Standard Specification for Polyethylene Plastic Molding and Extrusion Materials. Density is measured according to ASTM D1505. Preferably, the polyethylene is selected from the group consisting of LLDPE and HDPE. More preferably, the polyethylene is an HDPE. We found that the method of the invention gives HDPE increased melt elasticity and minimum reduction in both weight average molecular weight and number average molecular weight.

Suitable polyethylene for the use in the invention has the initial weight average molecular weight (Mw) preferably within the range from about 35,000 to about 3,500,000, more preferably from about 50,000 to about 2,500,000, and most preferably from about 100,000 to about 1,500,000. Preferably the polyethylene has a number average molecular weight (Mn) within the range of about 5,000 to about 500,000, more preferably from about 10,000 to about 300,000, and most preferably from about 15,000 to about 100,000. Preferably, the polyethylene resin has a bi- or multimodal HDPE.

The method of preparing the polyethylene resin is not particularly critical. For example, the resins can be made by a solution, slurry, or gas-phase process, or by a combination of these. Suitable methods can employ a single reactor or multiple reactors that are operated in series or in parallel if a bi- or multi-modal resin is desired. The catalysts can be Ziegler-Natta, single-site, late transition metal, modified variations or any combination thereof.

Preferably the polyethylene is a reactor powder. The average particle size of the polyethylene powder is preferably within the range of about 5 to about 2000, more preferably about 75 to 1500, and most preferably about 100 µm to about 1200 µm.

A free radical initiator can be used in combination with ozone if greater reactivity is desired. The initiator can be mixed with the polyethylene resin by any method known in the art providing substantially uniform distribution of the initiator with the resin. The amount of free radical initiator is preferably within the range of about 1 ppm to about 500 ppm, more preferably about 3 ppm to about 300 ppm, and most preferably about 5 ppm to about 100 ppm. Examples of suitable free radical initiators include peroxides, hydroperoxides, peresters, azo compounds, the like, and mixtures thereof. Preferably, the initiator is selected from the group consisting of dicumyl peroxide, di-t-butyl peroxide, t-butylperoxybenzoate, 2,5-dimethyl-2,5-di(t-butylperoxy)hexane, t-butyl peroxyneodecanoate, 2,5-dimethyl-2,5-di(t-butylperoxy) hexyne, t-amyl peroxypivalate, 1,3-bis(t-butylperoxyisopropyl)benzene, the like, and mixtures thereof.

Additives are optionally added to the polyethylene before, during or after the modification with ozone. Suitable additives include antioxidants, UV-absorbents, flow agents, the like, and mixtures thereof. The additives are added in an amount designed to produce the intended effect. Preferably the amount of additive will range from about 0.01 wt % to about 5.0 wt % of the total weight of the polyethylene resin.

Preferably, the method of the invention is integrated in a polyethylene production process. The integrated process comprises polymerizing ethylene or a mixture of ethylene and a $C_3$ to $C_{10}$ α-olefin to produce a polyethylene, isolating polyethylene powder from polymerization, modifying polyethylene powder with ozone according to the method of the invention, and compounding the modified polyethylene into a final product. Suitable $C_3$ to $C_{10}$ α-olefins include propylene, 1-butene, 1-hexene, 1-octene, 4-methyl-1-pentene, the like, and mixtures thereof. 1-Butene, 1-hexene, and mixtures thereof are particularly preferred. The ratio of ethylene to $C_3$ to $C_{10}$ α-olefin depends on the desired density and the α-olefin used. For example, a molar ratio of 1-butene/ethylene to produce a polyethylene having a density of about 0.920 g/cm³ is about 2.5/97.5. Increasing the amount of α-olefin decreases the density of polyethylene. The polymerization can be performed by Ziegler catalysts, single-site catalysts, or free radical initiators. The polymerization can be performed in solution, slurry, or gas phase. The polymerization can be performed in single reactor or in multi reactors. A multi-reactors process is preferred if a bimodal or multimodal polyethylene is desired. The ozone source can be located at the top of a powder silo. Ozone contacts and mixes with the reactor powder as the reactor powder F enters into the powder silo. Alternatively, the ozone source can be located on the bottom a powder silo. Ozone moves up while the polyethylene powder is falling. Thus ozone continuously contacts with the polyethylene powder in the silo. The modified polyethylene powder is then mixed with additives by extrusion and pelletized into final product.

The method of the invention provides the modified polyethylene with an at least 10% increase in melt elasticity, ER, compared with the polyethylene before modification. Preferably, the ER increase is greater than 15%. More preferably, the ER increase is greater than 50%. Preferably, the ER of the modified polyethylene is within the range of about 0.5 to about 4, more preferably from about 1.0 to about 3.5, and most preferably from about 1.5 to about 3.0. ER is a measure of the melt elasticity or the polydispersity of the polymer which is derived from the dynamic rheological data, see the article Shroff, et al., entitled "New Measures of Polydispersity from Rheological Data on Polymer Melts," *J. Applied Polymer Science*, Vol. 57, pp. 1605 1626 (1995), U.S. Pat. No. 5,534,472. Rheological measurements are made according to ASTM 4440-95a, which measures dynamic rheology data in the frequency sweep mode. A Rheometrics ARES rheometer is used, operating at 150° C. to 190° C., in parallel plate mode, under nitrogen. The gap in the parallel plate geometry ranges from 1.2 mm to 1.4 mm, the plate diameter is 25 mm or 50 mm, and the strain amplitude is from 10% to 20%. Frequencies range from about 0.0251 to 398.1 rad/sec. The storage modulus (G') and the loss modulus (G") are measured. The nine lowest frequency points are used and a linear equation is fitted by least-squares regression to log G' versus log G". ER is then calculated from:

$$ER=(1.781\times10^{-3})\times G'$$

at a value of G"=5,000 dyn/cm². When the lowest G" value is greater than 5,000 dyn/cm², the determination of ER involves extrapolation. The ER values calculated then will depend on the degree on nonlinearity in the log G' versus log G" plot. The temperature, plate diameter, and frequency range are selected such that, within the resolution of the rheometer, the lowest G" value is close to or less than 5,000 dyn/cm². The ER for the Examples discussed below are determined using a temperature of 190° C., a plate diameter of 50 mm, a strain amplitude of 10%, and a frequency range of 0.0251 to 398.1 rad/sec.

An increase in melt strength of the modified polyethylene resin is also demonstrated by the upturn in dynamic complex viscosity ($\eta^*$) at frequencies of less than about 0.1 rad/sec. Prior to modification with ozone the resin usually exhibits a limiting constant value at frequencies of less than about 0.0251 rad/sec. The relative increase in complex viscosity is expressed as a ratio: $\eta^*$(modified polyethylene)/$\eta^*$(unmodified polyethylene), at a frequency of 0.1 radians/second. Preferably, the relative increase in complex viscosity is by at least 5%, more preferably at least by 15% Those with skill in the art will understand that a specific complex viscosity ratio is generated under a specific set of conditions, e.g. temperature. If the conditions are varied the ratios recited in this specification and claims can also vary. The viscosity ratios are provided to illustrate the viscosity upturn not to limit the scope of this invention in any way.

The modified polyethylene can be used in many applications. Preferably, the modified polyethylene is used in applications where enhanced melt strengths are desirable, such as extrusion coating, blow molding and film operations. It can also be used for the production of multi-layer films, sheets and pipes. The modified polyethylene offers greater bubble stability for film applications and reduced die swell and parison stability for blow-molding applications.

The following examples merely illustrate the invention. Those skilled in the art will recognize many variations that are within the spirit of the invention and scope of the claims.

Example 1

Modification of LLDPE

A column (11 inch length by 2 inch diameter) is filled with a linear low density polyethylene (LLDPE) powder (100 g, PETROTHENE® GA605, product of Equistar Chemicals, LP). The LLDPE has a weight average molecular weight ($M_w$) of 158,000, number average molecular weight (Mn) of 33,100, melt elasticity (ER) of 0.72, and complex viscosity ($\eta^*$) of $1.13\times10^5$ poise at a frequency of 0.1 rad/sec. The column is placed inside a hood at room temperature (25° C.). An ozone generator is connected to the bottom of the column. Ozone passes through the polyethylene in a rate of about 0.22 lbs/h for about an hour. The $M_w$, Mn, ER and $\eta^*$ of the modified LLDPE are 146,000, 20,700, 1.10, and $1.32\times10^5$ poise, respectively. The increases in ER (53%) and in $\eta^*$ (17%) indicate that the modified polyethylene exhibits improved melt strength. The reduction in Mw is about 7.6%, while the reduction in Mn is about 38%.

Example 2

Modification of HDPE

The procedure of Example 1 is repeated with a high density polyethylene (HDPE) powder (ALATHON®) L5005, product of Equistar Chemicals, LP). The HDPE is a bimodal polyethylene and has a density of 0.950 g/cm³, $M_w$ of 314,000, Mn of 12,800, ER of 2.78, and $\eta^*$ of $1.03 \times 10^6$ poise at a frequency of 0.0251 rad/sec. The $M_w$, Mn, ER and $\eta^*$ of the modified HDPE are 298,000, 12,500, 3.21, and $1.09 \times 10^6$ poise, respectively. The increases in ER and $\eta^*$ are 15.5% and 6%, respectively, while the reductions in Mw and Mn are 4.5% and 2.3%, respectively. Compared with the modified LLDPE of Example 1, the modified HDPE of Example 2 shows not only low reduction in Mw but also low reduction in Mn.

We claim:

1. A method of modifying a polyethylene, which comprises contacting a polyethylene powder having an initial weight average molecular weight (Mw) within the range from about 35,000 to about 3,500,000, at a temperature within the range of about 20° C. to about 80° C., with a contacting time within the range from about 30 minutes to about 8 hours, with ozone wherein the ozone concentration is within the range of about 0.01 wt % to about 200 wt % of the polyethylene, to produce a modified polyethylene having reduced weight average molecular weight (Mw) by less than 20% and increased melt elasticity (ER) by at least 10%.

2. The method of claim 1 wherein the ozone concentration is within the range of about 6 wt % to about 100 wt % of the polyethylene.

3. The method of claim 1 wherein the temperature is within the range of about 25° C. to about 55° C.

4. The method of claim 1 wherein the temperature is within the range of about 25° C. to about 35° C.

5. The method of claim 1 wherein the Mw reduction is less than 10%.

6. The method of claim 1 wherein the Mw reduction is less than 5%.

7. The method of claim 1 wherein the ER increase is greater than 15%.

8. The method of claim 1 wherein the ER increase is greater than 50%.

9. The method of claim 1 wherein the polyethylene is a bimodal, high density polyethylene.

10. The method of claim 1 wherein the modified polyethylene has an increase in complex viscosity ($\eta^*$) by at least 5%.

11. The method of claim 10 wherein the increase in $\eta^*$ is at least 15%.

* * * * *